(12) United States Patent
Gordon

(10) Patent No.: US 6,219,658 B1
(45) Date of Patent: Apr. 17, 2001

(54) METHOD FOR LEARNING DATA CLASSIFICATION IN TWO SEPARATE CLASSES SEPARATED BY A REGION DIVIDER OF ORDER 1 OR 2

(75) Inventor: Mirta Gordon, Grenode (FR)

(73) Assignees: Commisariat a l'Energie Atomique; Centre National de la Recherc Scientifique, both of Paris (FR)

( * ) Notice: Subject to any disclaimer, the term of this patent is extended or adjusted under 35 U.S.C. 154(b) by 0 days.

(21) Appl. No.: 09/269,204

(22) PCT Filed: Sep. 29, 1997

(86) PCT No.: PCT/FR97/01713

§ 371 Date: Mar. 31, 1999

§ 102(e) Date: Mar. 31, 1999

(87) PCT Pub. No.: WO98/14892

PCT Pub. Date: Apr. 9, 1998

(30) Foreign Application Priority Data

Oct. 1, 1996 (FR) .................................................. 9611939

(51) Int. Cl.⁷ .................................................. G06N 3/02

(52) U.S. Cl. .................................................. 706/15; 706/15; 706/16; 706/17

(58) Field of Search .................................................. 706/15, 16, 17, 706/18, 19, 20, 14, 25, 40; 382/158

(56) References Cited

U.S. PATENT DOCUMENTS

| | | | |
|---|---|---|---|
| 5,058,179 | * | 10/1991 | Denker et al. ........................ 382/158 |
| 5,130,563 | * | 7/1992 | Nabet et al. ............................ 706/40 |
| 5,153,923 | * | 10/1992 | Matsuba et al. ...................... 382/158 |
| 5,303,328 | * | 4/1994 | Masui et al. ............................ 706/25 |
| 5,748,847 | * | 5/1998 | Lo ......................................... 706/14 |

OTHER PUBLICATIONS

G. C. Fox and W. Furmanski; Load balancing loosely synchronous problems with a neural network; Proceedings of the third conference on Hypercube concurrent computers and applications (2 Volumes), Jan. 1988, pp. 241–278.*

G. C. Fox and W. Furmanski; A string theory for time dependent complex systems and its application to automatic decomposition; Proceedings of the third conference on Hypercube concurrent computers and applications (2 Volumes), Jan. 19–20, 1988, Pages.*

(List continued on next page.)

Primary Examiner—Mark R. Powell
Assistant Examiner—Wilbert Starks
(74) Attorney, Agent, or Firm—Oblon, Spivak, McClelland, Maier & Neustadt, P.C.

(57) ABSTRACT

A method for learning to classify data according to two distinct classes (c11, c12) separated by a separating surface (S), by means of a neurone of the binary type comprising a parameter describing the separating surface and whose inputs are weighted by a weight ($w_i$), and including the following steps:

a) defining a cost function C:

$$C_\sigma = \sum_{\substack{\mu=1 \\ \{\gamma^\mu > 0\}}}^{P} \left[ A - B\tanh\frac{\sigma\gamma^\mu}{2T+} \right] + \sum_{\substack{\mu=1 \\ \{\gamma^\mu \leq 0\}}}^{P} \left[ A - B\tanh\frac{\sigma\gamma^\mu}{2T-} \right]$$

b) initializing the weights ($W_i$), the radii ($r^i$), the parameters ($\sigma$, T+, T−), the learning rate ($\epsilon$) and speeds of the temperature decreasing ($\delta$T+, $\delta$T−);

c) minimizing the cost function C by successive iterations;

d) obtaining the values of the weights of the connections and radii of the neurone.

Application to the classification and recognition of shapes by a neural network.

3 Claims, 2 Drawing Sheets

OTHER PUBLICATIONS

Bernhard E. Boser, Isabelle M. Guyon and Vladimir N. Vapnik; A training algorithm for optimal margin classifiers; Proceedings of the fifth annual ACM workshop on Computational learning theory, Jul. 27–29, 1992, pp. 144–152.*

A. K. Jain, M. N. Murty and P. J. Flynn; Data clustering: a review; ACM Comput. Surv. 31, 3 (Sep. 1999), pp. 264–323, Jan. 1998.*

* cited by examiner

METHOD FOR LEARNING DATA CLASSIFICATION IN TWO SEPARATE CLASSES SEPARATED BY A REGION DIVIDER OF ORDER 1 OR 2

TECHNICAL FIELD

The invention concerns a method for teaching a neurone to classify data in two classes separated by a 1st-order separating surface, that is to say a hyperplane, or by a 2nd-order separating surface, for example a hypersphere.

This invention finds applications in fields using neural networks and, in particular, for medical diagnosis, recognition of shapes or classification of objects or data such as spectra, signals, etc.

STATE OF THE ART

Neural networks are systems which perform, on numerical information, calculations inspired by the behaviour of physiological neurones. A neural network must therefore learn to perform tasks which it is wished it will carry out subsequently. For this purpose, an example base, or learning base, is used, which contains a series of known examples used for teaching the neural network to perform the tasks which it will have to reproduce subsequently with unknown information.

A neural network is composed of a set of formal neurones. The neurones are connected to each other by connections which each have a synaptic weight. Each neurone (also referred to as a generalised perceptron) is a calculation unit consisting of an input and an output corresponding to a state. At each instant, the state of each neurone, weighted by the synaptic weight of the corresponding connection, is communicated to the other neurones in the set. The total level of activation which the neurone receives, at its input, is equal to the sum of the weighted states of the other neurones. At each instant, this activation level is used by this neurone to update its output.

At the current time there exist several learning algorithms making it possible to teach a neurone, intended to be used within a neural network, to perform a precise task, such as classifying data (or patterns).

The quality of these algorithms is judged from two different aspects, according to the type of task to be performed. A first case is the one where the examples of the learning set can all be learnt by the neurone. In this case, the algorithm must be capable of finding the weights which correctly classify not only the examples but also new patterns, that is to say the neurone must have weights capable of effectively generalising. A second case is the one where it is not possible for the neurone to learn all the examples. Then the algorithm must find the weights which minimise the number of learning errors. However, there is no learning algorithm which gives satisfactory weights in both cases described.

A neurone learning algorithm is described in the document "A thermal perceptron learning rule" by Marcus Frean, in Neural Computation No 4, pages 946–957 (1992).

This algorithm makes it possible to determine weights, but it does not give the optimum solution to the problem to be resolved. Consequently such an algorithm does not minimise the number of learning errors and does not generalise in an optimum fashion.

Another neurone learning algorithm is described in the document "Perceptron-based learning algorithms" by S. I. Gallant, in IEEE Transaction on Neural Networks Vol. 1 No 2, June 1990.

This algorithm makes it possible to obtain good results in the case of neurones capable of learning all the learning examples, provided that convergence of the algorithm is awaited. However, where the learning set cannot be learnt by a single neurone, this algorithm does not converge. It is therefore impossible to know whether the algorithm does not "stop" because it has not found a solution or because sufficient time has not been waited for.

DISCLOSURE OF THE INVENTION

The aim of the invention is precisely to resolve the drawbacks of the techniques proposed previously. To this end, it proposes a method or algorithm which converges whatever the case encountered and which in addition has optimum performance. In other words, the invention proposes a method for teaching a neurone to classify data into two classes separated by a separation surface which can be either linear or quadratic.

Hereinafter, either neurone or generalised perceptron will be spoken of indifferently, neurone or perceptron representing binary units. As an indication, it may be noted, for example, that a linear perceptron is a neurone which produces linear separation surfaces.

The invention concerns, more precisely, a method for teaching a neurone with a quadratic activation function to classify data according to two distinct classes separated by a separating surface, this neurone being a binary neurone having N connections coming from the input and receiving as an input N numbers representing a data item, or pattern, intended to be classified using a learning base containing a plurality of known data, each input of the neurone being affected by the weight ($w_i$) of the corresponding connection, characterised in that it includes the following steps:

a) defining a cost function C by determining, for each neurone and as a function of a parameter describing the separating surface, a stability $\gamma^\mu$ of each data item $\mu$ of the learning base, the cost function being the sum of all the costs determined for all the data in the learning base with:

$$C_\sigma = \sum_{\substack{\mu=1 \\ (\gamma^\mu > o)}}^{P} \left[A - B\tanh\frac{\sigma\gamma^\mu}{2T+}\right] + \sum_{\substack{\mu=1 \\ (\gamma^\mu \leq 0)}}^{P} \left[A - B\tanh\frac{\sigma\gamma^\mu}{2T-}\right]$$

where A is any value, B is any positive real number, P is the number of data items in the learning base, $\gamma^\mu$ is the stability of the data item $\mu$; T+ and T− are two parameters of the cost function (referred to as "temperatures"); $\sigma$ takes the value +1 if it has been chosen that $\gamma^\mu > 0$ an corresponds to a correct and $\gamma^\mu < 0$ an incorrect classification or the value −1 in the contrary case.

b) initialising the weights $w_i$, the radii $r_i$, the parameters T+ and T−, with T+<T−, a learning rate $\epsilon$ and speeds of the temperature decreasing $\delta$T+ and $\delta$T−;

c) minimising, with respect to the weight of the connections $W_i$ and the radii, the cost function C by successive iterations during which the parameters T+ and T− decrease at speeds of the temperature decreasing $\delta$T+ and $\delta$T− as far as a predefined stop criterion;

d) obtaining values of the weights of the connections and the radii of the neurone.

These values of the connection weights and radii are, for example, displayed on a screen, recorded in computer files.

According to one embodiment of the invention, the stability of each data item is:

$$\gamma^\mu = y^\mu \ln\left[\sum_{i=1}^{N} \frac{(w_i - x_i^\mu)^2}{r_i^2}\right],$$

with $y = +1$ or $-1$, and where $\mu$ is the label of the pattern, $x^\mu_i$ is the value of the pattern $\mu$ for the $i^{th}$ input, $y^\mu$ is the class of the pattern $\mu$, M is the number of inputs and connections of the neurone, $w_i$ is the weight of the connection between the input i and the neurone and $r_j$ is the radius parameter for the $i^{th}$ input.

According to another embodiment of the invention, the stability of each data item is $$\gamma^\mu = y^\mu \left[\sum_{i=1}^{N} [(w_i - x_i^\mu)^2 - r_i^2]\right]$$

with $y = +1$ or $-1$, and where $\mu$ is the label of the pattern, $x^\mu_i$ is the value of the pattern $\mu$ for the $i^{th}$ input, $y^\mu$ is the class of the pattern $\mu$, N is the number of inputs and connections of the neurone, $w_i$ is the weight of the connection between the input i and the neurone and $r_i$ is the radius parameter for the $i^{th}$ input.

DISCLOSURE OF EMBODIMENTS OF THE INVENTION

The invention concerns a method which makes it possible to teach a neurone to classify data according to two different classes separated by a quadratic surface.

Figure 1:
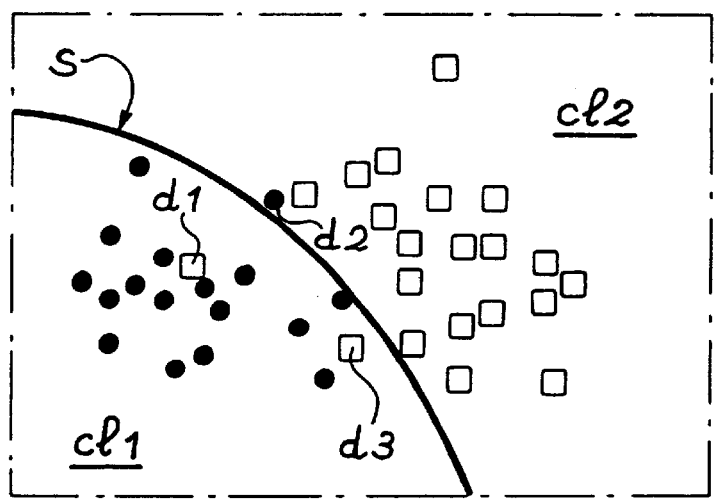
FIG. 1 depicts schematically a set of data classified according to two classes separated by the quadratic surface.

FIG. 1 depicts a plurality of data classified according to two classes, referred to as C11 and C12. These two classes are separated by the separating surface S. The separating surface S depicted in this FIG. 1 is a curved surface produced according to the invention.

As can be seen in the example shown in this figure, the large majority of the data, represented by empty squares or by solid circles, are correctly classified. Only three data items d1, d2 and d3 are wrongly classified. It is this number of wrongly classified data items in the test base which makes it possible to determine the learning ability of the algorithm and therefore its performance.

This FIG. 1 therefore shows input vectors of two types, the solid circles and the empty squares, classified by a quadratic neurone of weight $\vec{W}$.

The aim of the learning, in general terms, is to find the synaptic weights $w_i$ from a set of P examples, so as to obtain the required outputs. This is then referred to as supervised learning. This corresponds to seeking, in the space of the weights $w_i$ and radii $r_i$, a separating surface S such that it separates the examples whose output is +1 from the examples whose output is −1.

The separating surface is of the form:

$$S = \sum_{i=1}^{N} [(w_i - x_i)^2 - r_i^2]$$

such that:
if S>0, then the output corresponding to the input pattern, or input data item, $(x_i, \ldots, x_i, \ldots, x_N)$, where $x_i$ is the value of pattern on the $i^{th}$ input, is +1;
if S<0 the output is −1.

If the radius is unique, $r_i = r$ for any i, the separating surface is a hypersphere. The number of parameters to be determined is then N+1. The method applies to any other shape of 2nd order surface, for example a hyperellipsoidal, hyperboloidal etc surface, whose weight searching space is much larger than the case of a hypersphere.

A good measurement of the learning quality of an example $\mu$ is its stability $\gamma^\mu$ which is a function of the weights. The modulus of the stability $\gamma^\mu$ is a measurement of the distance from the example $\mu$ to the separating surface S. A high positive stability ensures a certain degree of robustness of the response of the neurone.

The method of the invention which will be described applies to a neurone.

This method consists in teaching a neurone to classify data into two classes C1 and C12 separated by a quadratic surface S. This learning is effected by means of an example base, referred to as a "learning base", which includes a plurality of examples, or patterns, or data, known and previously itemised by experts.

The neurone receives at its input a pattern which it has to classify; the state of the neurone, since this is binary, is for example 1 or −1, according to the class allocated to the pattern, any other linear coding which can be referred to this coding. It should be stated that each neurone has a number N of inputs, predefined according to the problem to be dealt with, and parameters $r_i$ representing the radii of the separating surface, and that each of the connections coming from the inputs is characterised by a weight $w_i$ (i=1 to N).

The learning of the values of the weights $w_i$ and radii $r_i$ is effected by minimising a cost function.

Figure 2:
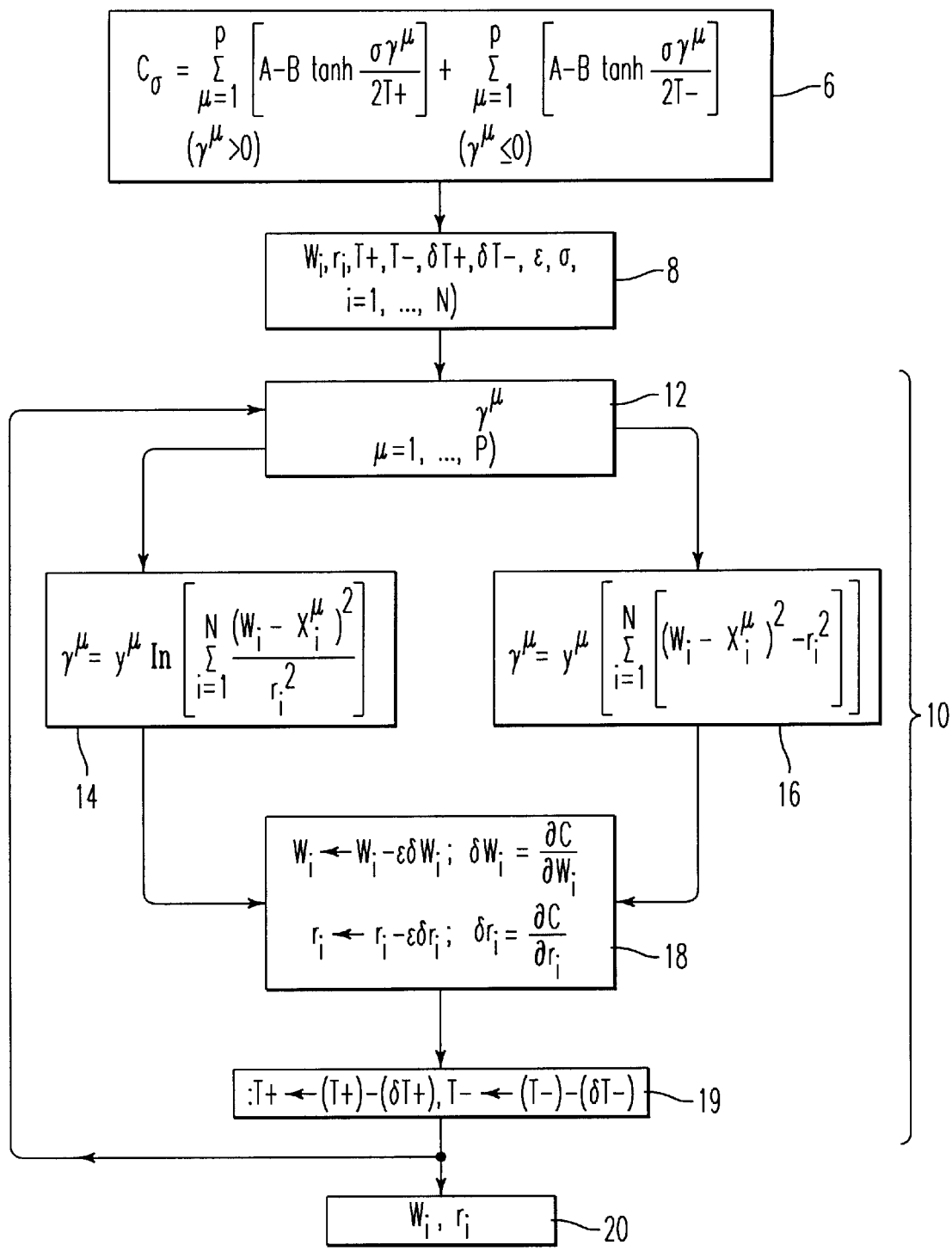
FIG. 2 depicts the functional diagram of the method according to the invention.

As shown in FIG. 2, the learning method according to the invention consists of a method of minimising a cost function defined in step 6. This cost function is:

$$C_\sigma = \sum_{\substack{\mu=1 \\ (\gamma^\mu > o)}}^{P} \left[A - B\tanh\frac{\sigma\gamma^\mu}{2T_+}\right] + \sum_{\substack{\mu=1 \\ (\gamma^\mu \leq 0)}}^{P} \left[A - B\tanh\frac{\sigma\gamma^\mu}{2T_-}\right]$$

The method of minimising this cost function commences with a first step 8 of initialising the parameters of the learning method. In particular, it consists in initialising the parameters σ, T+ and T−, the weights $w_i$ and the radius parameters $r_i$. Amongst these parameters, there are also found the learning rates ε and the cooling speeds, referred to as the ?? speeds, and which are the values of δT+ and δT− of decrementation of the temperatures T+ and T−, at each iteration.

It also includes a step 10 of minimisation by iteration of the cost function.

Each iteration of this minimisation step 10 includes a first substep 12 which consists of determining the stability $\gamma^\mu$ of each pattern of the learning base, for the values of the weights and of the radius parameters of the neurone taken at each iteration.

The stability of this pattern is calculated at steps 14 or 16, from the expressions:

$$\gamma^\mu = y^\mu \ln\left[\sum_{i=1}^{N} \frac{(w_i - x_i^\mu)^2}{r_i^2}\right].$$

Advantageously it is also possible to use the following definition:

$$\gamma^\mu = y^\mu \left[\sum_{i=1}^{N} [(W_i - x_i^\mu)^2 - r_i^2]\right]$$

where $\mu$ is the label of the pattern, $x_i^\mu$ is the value of the pattern $\mu$ of the $i^{th}$ input, $y^\mu$ is the class of the pattern $\mu$ with $\mu$ ranging from 1 to P (P being the number of patterns in the learning base), N is the number of inputs and connections of the neurone, $w_i$ is the weight of the connection between the input i and the neurone and $r_i$ is the radius parameter.

Whatever the way of calculating the stabilities $\gamma^\mu$, the following step of the method (step 18) consist in using the cost function for modifying the weight and radius in order to cause the cost function to decrease to a minimum; this cost function C is given by the expression:

$$C_\sigma = \sum_{\substack{\mu=1 \\ (\gamma^\mu > o)}}^{P} \left[A - B\tanh\frac{\sigma\gamma^\mu}{2T+}\right] + \sum_{\substack{\mu=1 \\ (\gamma^\mu \leq 0)}}^{P} \left[A - B\tanh\frac{\sigma\gamma^\mu}{2T-}\right]$$

where A is any value, B is any positive real number, P is the number of data items in the learning base, $\gamma^\mu$ is the stability of the data item $\mu$, T+ and T− are two parameters of the cost function (referred to as "temperatures"), and $\sigma$ is a variable which can take the value +1 or the value −1: when $\sigma$=+1 the positive class patterns are outside the 2nd order surface and when $\sigma$=−1 it is the converse, that is to say the patterns of the positive class are inside the 2nd order surface.

This cost function is slowly variable for the stabilities with high absolute value and rapidly variable for stabilities close to zero. The region of rapid variation of this function is controlled by two parameters, referred to as "temperature", and denoted T+ and T−, with T+ for the positive stabilities and T− for the negative stabilities, T+$\leq$T−.

The stability of a pattern correctly learned by the neurone is positive; on the other hand, the stability of a wrongly learned pattern is negative.

The modulus of the stability is an increasing monotonic function of the difference between the pattern and the separating surface S defined by the weights and the radius or radii of the neurone.

The aim of the invention is therefore to propose an algorithm for obtaining the most patterns with positive stability, which corresponds to the best possible learning quality.

The method according to the invention consists of minimising the cost function C. This minimisation is effected iteratively, by simple gradient in which, at each iteration, the values T+ and T− decrease respectively from $\delta$T+ and $\delta$T− until the predefined stop criterion is arrived at (step 19). This stop criterion can be a conventional stop criterion, such that the derivative of the cost function has an absolute value less than a small number referred to as the degree of tolerance in the determination of the minimum. The iteration is shown schematically, in FIG. 2, by an arrow returning to step 12.

When the stop criterion is met, the $w_i$ and $r_i$ values are displayed on the screen and recorded in a file with a view to subsequent use. This is represented by step 20 in FIG. 2.

In this way the parameters (weights of the connections and radii) describing the separating surface have been determined. The separating surface is therefore created. Thus, when all the examples of the learning base have been processed and have given a minimum error rate, cases are then dealt with which are unknown to the neural network thus formed, considering whether the error rate obtained for the examples of the learning base is good, then the classification of unknown patterns will be effected correctly.

Figure 3:
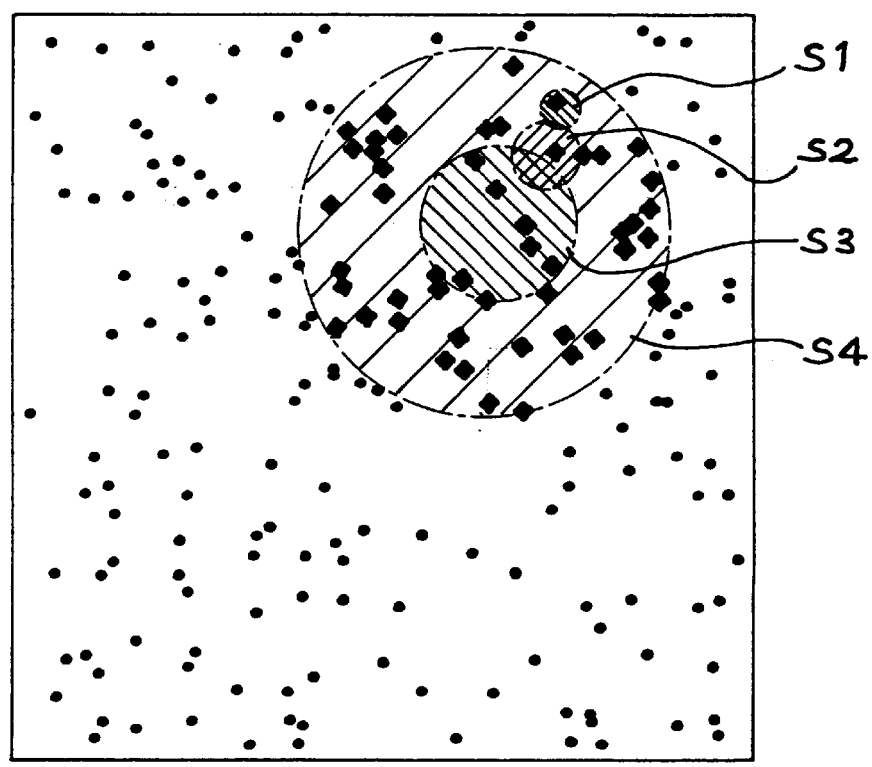
FIG. 3 depicts an example of a separating surface refined little by little during the learning.

FIG. 3 depicts schematically different stages of determination of a 2nd order separating surface with a single radius, determined by the method of the invention in a case where the inputs are of dimensions N=2; the surface is then a circle.

More precisely, the solid points and the empty points shown in FIG. 3 each represent a data item in the learning set. The method seeks to determine the separating surface S4 enabling the circles to be separated from the squares. Each circle represents the separating surface at a different iteration; the surface is refined as the method proceeds. Thus the surface S1 represents the first surface determined during the very first iterations of the method; the surface S2 shows the separation surface determined after a few additional iterations. The surface S3 is the one determined after new iterations.

Finally, the surface S4 is obtained and entirely separates the squares from the circles. The final surface being found, the method, as described above, stops.

What is claimed is:

1. A method for teaching a neurone with a quadratic activation function to classify data according to two distinct classes (c11, c12) separated by a separating surface (S), this neurone being a binary neurone having N connections coming from an input and receiving as an input N numbers representing a data item intended to be classified using a learning base containing a plurality of known data, each input of the neurone being affected by a weight ($w_i$) of the corresponding connection, characterised in that it includes the following steps:
  a) defining a cost function ($C_\sigma$) by determining, as a function of a parameter describing the separating surface, a stability ($\gamma^\mu$) of each data item ($\mu$) of the learning base, the cost function being the sum of all the costs determined for all the data in the learning base with:

$$C_\sigma = \sum_{\substack{\mu=1 \\ (\gamma^\mu > o)}}^{P} \left[A - B\tanh\frac{\sigma\gamma^\mu}{2T+}\right] + \sum_{\substack{\mu=1 \\ (\gamma^\mu \leq 0)}}^{P} \left[A - B\tanh\frac{\sigma\gamma^\mu}{2T-}\right]$$

where A is any value, B is any positive real number, P is the number of data items in the learning base, $\gamma^\mu$ is the stability of the data item $\mu$, and T+, T− and $\sigma$ are two parameters of the cost function;
  b) initialising the weights ($w_i$), the radii ($r_i$), the parameters (T+ and T−, with T+<T−), a learning rate $\epsilon$ and speeds of the temperature decreasing ($\delta$T+ and $\delta$T−);
  c) minimising, with respect to the weight of the connections ($W_i$) and the radii ($r_i$), the cost function ($C\sigma$) by successive iterations during which the parameters (T+ and T−) decrease at speeds of the temperature decreasing ($\delta$T+ and $\delta$T−) as far as a predefined stop criterion;
  d) obtaining values of the weights of the connections and the radii of the neurone.

2. A method according to claim 1, characterised in that the stability of each data item is:

$$\gamma^\mu = y^\mu \ln\left[\sum_{i=1}^{N} \frac{(w_i - x_i^\mu)^2}{r_i^2}\right],$$

with $y = +1$ or $-1$, and where $\mu$ is the label of the pattern, $x^\mu_i$ is the value of the pattern $\mu$ for the $i^{th}$ input, $y^\mu$ is the class of the pattern $\mu$, N is the number of inputs and connections of the neurone, $w_i$ is the weight of the connection between the input i and the neurone and $r_j$ the radius parameter for the $i^{th}$ input.

3. A method according to claim 1, characterised in that the stability of each data item is $$\gamma^\mu = y^\mu \left[\sum_{i=1}^{N} [(w_i - x_i^\mu)^2 - r_i^2]\right]$$

with $y = +1$ or $-1$, and where $\mu$ is the label of the pattern, $x^\mu_i$ is the value of the pattern $\mu$ for the $i^{th}$ input, $y^\mu$ is the class of the pattern $\mu$, N is the number of inputs and connections of the neurone, $w_i$ is the weight of the connection between the input i and the neurone and $r_i$ is the radius parameter for the $i^{th}$ input.

* * * * *

UNITED STATES PATENT AND TRADEMARK OFFICE
CERTIFICATE OF CORRECTION

PATENT NO. : 6,219,658 B1
DATED : April 17, 2001
INVENTOR(S) : Gordon

It is certified that error appears in the above-identified patent and that said Letters Patent is hereby corrected as shown below:

<u>Title page,</u>
Item [73], the 2$^{nd}$ Assignee's name is incorrect. Item [73] should read as follows: -- [73], Assignees: Commisariat A L'Energie Atomique;
Centre National de la Recherche Scientifique,
both of Paris [FR] --

Signed and Sealed this

Thirtieth Day of October, 2001

Attest:

*Attesting Officer*

NICHOLAS P. GODICI
*Acting Director of the United States Patent and Trademark Office*